(12) United States Patent
Lee

(10) Patent No.: US 11,545,693 B1
(45) Date of Patent: Jan. 3, 2023

(54) FLAG FORMING DEVICE AFTER LASER NOTCHING OF SECONDARY BATTERIES FOR ELECTRIC VEHICLES

(71) Applicant: Kye-Seol Lee, Seoul (KR)

(72) Inventor: Kye-Seol Lee, Seoul (KR)

( * ) Notice: Subject to any disclaimer, the term of this patent is extended or adjusted under 35 U.S.C. 154(b) by 0 days.

(21) Appl. No.: 17/537,127

(22) Filed: Nov. 29, 2021

(30) Foreign Application Priority Data

Oct. 28, 2021 (KR) .................. 10-2021-0145143

(51) Int. Cl.
*H01M 10/04* (2006.01)
(52) U.S. Cl.
CPC ... *H01M 10/0409* (2013.01); *H01M 10/0431* (2013.01)
(58) Field of Classification Search
CPC .............. H01M 10/48; H01M 10/425; H01M 10/4221; H01M 20/20; H01M 10/04; H01M 10/0404; Y02E 60/10
See application file for complete search history.

(56) References Cited

FOREIGN PATENT DOCUMENTS

| KR | 101604052 B1 | 3/2016 | |
| KR | 101802297 B1 | 11/2017 | |
| KR | 20180013158 | * 2/2018 | ........ H01M 10/4221 |

* cited by examiner

*Primary Examiner* — Cynthia H Kelly
*Assistant Examiner* — Monique M Wills
(74) *Attorney, Agent, or Firm* — STIP Law Group, LLC

(57) ABSTRACT

The present invention relates to a flag forming device after laser notching of a secondary battery for an electric vehicle, and particularly, to a flag forming device after laser notching of a secondary battery for an electric vehicle configured by stacking electrode rolls within a circular box, which makes a flag shape by notching an uncoated portion having no coating of a negative electrode and a positive electrode with a laser, and makes the uncoated flag made by laser notching pass through a flag forming unit before winding to enable an uncoated tap to be folded inward. The present invention includes a flag forming device after laser notching of a secondary battery for an electric vehicle of the present invention including a tilt EPC unit 1 which moves a pole plate while maintaining a material uniformly and constantly at a setting value of an EPC sensor when the pole plate is moved, the EPC sensor 2 which numerically indicates the degree of distortion when the pole plate is moved through the tilt EPC unit 1, a flag forming unit 3 which molds a flag of the pole plate moved through the EPC sensor 2, an encoder roller 4 which measures a movement distance of the pole plate passing through the flag forming unit 3, a winding unit 5 which winds an electrode that has passed through the flag forming unit 3, and an air nozzle 6 which blows air before an uncoated flag is wound in the winding unit 5 to enable an uncoated tab to be folded inward.

2 Claims, 3 Drawing Sheets

[FIG. 1]
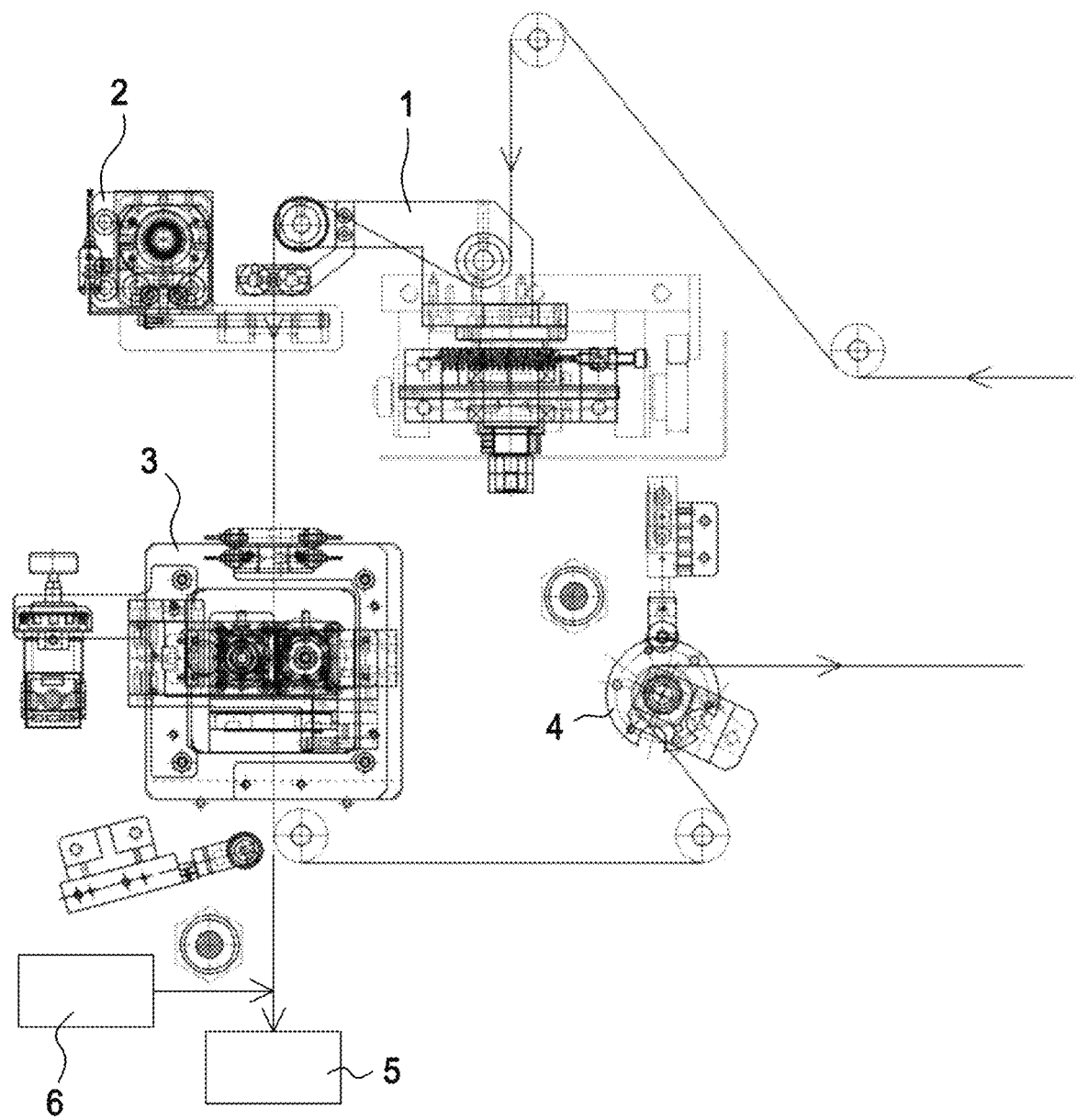

[FIG. 2]
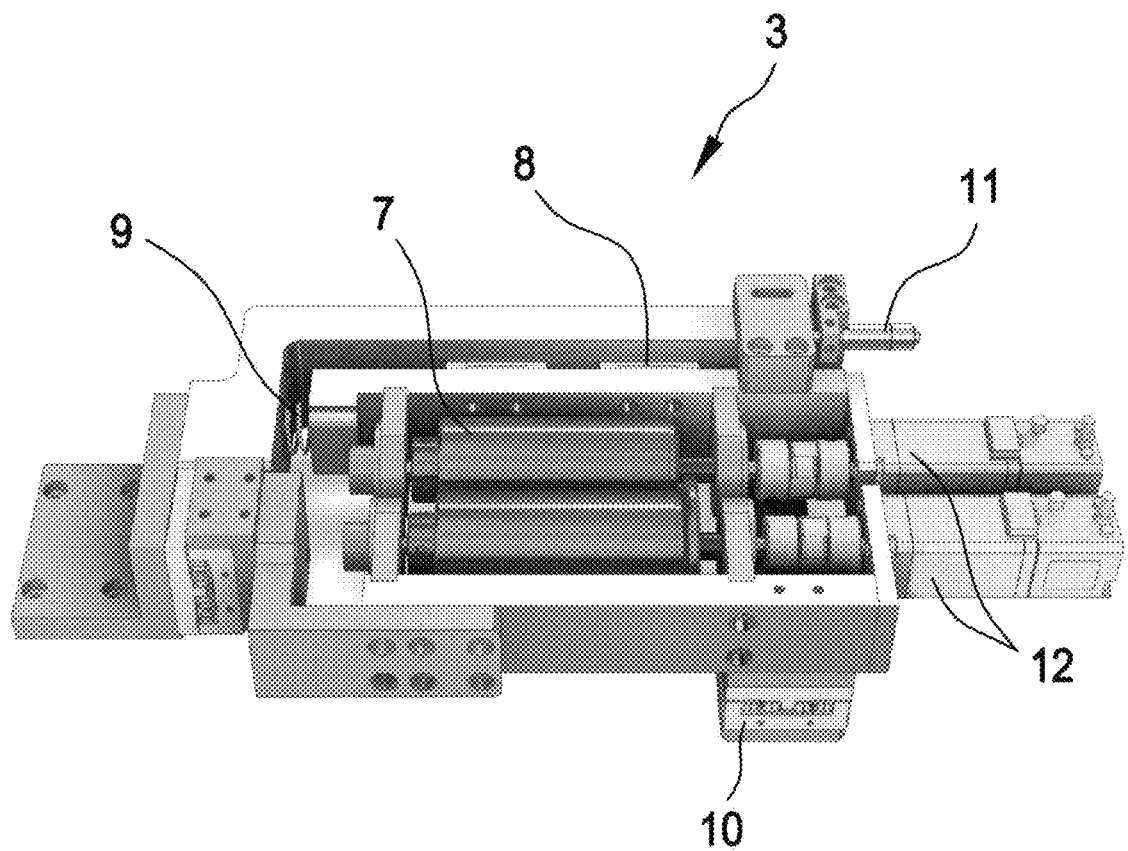

[FIG. 3A]
(A)
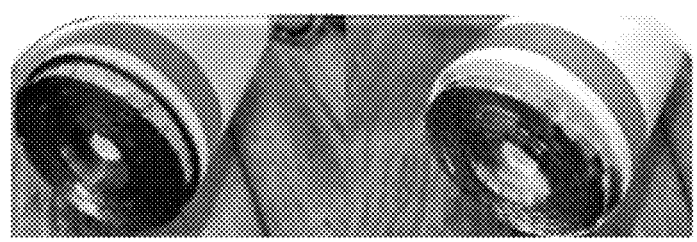
[FIG. 3B]
(B)
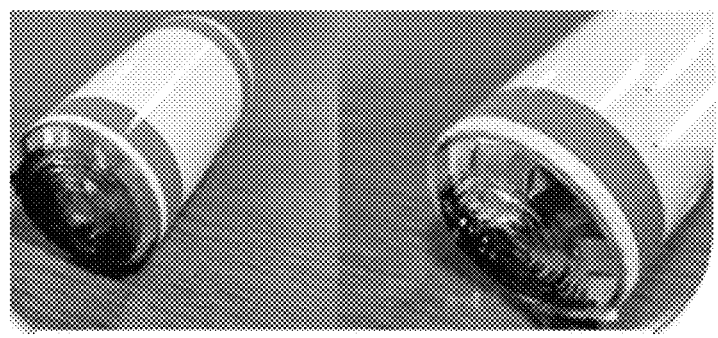

FLAG FORMING DEVICE AFTER LASER NOTCHING OF SECONDARY BATTERIES FOR ELECTRIC VEHICLES

CROSS-REFERENCE TO RELATED APPLICATIONS

This application claims priority to and the benefit of the Korean Patent Application No. 10-2021-0145143 filed in the Korean Intellectual Property Office on Oct. 28, 2021, the entire contents of which are incorporated herein by reference.

TECHNICAL FIELD

The present invention relates to a flag forming device after laser notching of a secondary battery for an electric vehicle, and particularly, to a flag forming device after laser notching of a secondary battery for an electric vehicle configured by stacking electrode rolls within a circular box, which makes a flag shape by notching an uncoated portion having no coating of a negative electrode and a positive electrode with a laser, and makes the uncoated flag made by laser notching pass through a flag forming unit before winding to enable an uncoated tap to be folded inward.

BACKGROUND ART

In general, lithium ion batteries have not been commercialized due to stability problems due to the high reactivity of lithium, but have recently started to be commercialized and the lithium ion batteries have the following advantages compared to other batteries.

That is, because lithium metal is lighter than any other metal, the lithium metal has a very large energy density and large electromotive force, and has no memory effect, so the lithium ion battery may be charged even in a charged state at a certain degree without being completely discharged, and power loss due to self-discharge is very little.

The lithium ion secondary battery having the foregoing advantages is a high-voltage battery with stability because the lithium ion secondary battery can be rapidly charged due to an inflow reaction of lithium ions, in which a charging reaction of the negative electrode is relatively fast, and exist in the state of lithium ions, and the lithium ion secondary battery is mainly used in portable electronic devices, such as a mobile phone and a notebook computer, because the lithium ion secondary battery has large charging capacity and can be miniaturized, and recently, the lithium ion secondary battery is used in a battery for an electric vehicle.

The lithium ion secondary battery is completed by manufacturing a positive electrode and a negative electrode by applying a positive electrode active material and a negative electrode active material on metal foil, manufacturing a jelly roll by putting a separation film between both electrodes and winding the separation film, inserting the jelly roll (electrode roll) into a cylindrical or square metal container, and filling the cylindrical or square metal container with an electrolyte and sealing the cylindrical or square metal container.

The jelly roll refers to a product produced by winding the secondary battery.

Herein, the jelly roll is finally finished and completed in such a manner that a negative electrode plate is first wound, the separation film is wound on the negative electrode plate, a positive electrode plate is wound on the separation film, a positive electrode surrounds a negative electrode at the topmost portion with the separation film interposed therebetween, and the separation film is located on the surface.

The secondary battery used in an electric vehicle is a chemical cell that repeats charging and discharging by using reversible interconversion of chemical energy and electrical energy, and high-performance secondary batteries include Ni-MH secondary batteries and lithium secondary batteries, and lithium secondary batteries include lithium metal secondary batteries, lithium ion secondary batteries (prismatic, cylindrical, and pouch types), lithium ion polymer secondary batteries, lithium polymer secondary batteries, and the like.

Recently, with the commercialization of electric vehicles, research on automation equipment for mass production of the lithium secondary batteries is being actively conducted along with the development of large-sized lithium secondary batteries for electric vehicles.

Among the lithium ion secondary batteries, in particular, pouch-type batteries are easily deformable in shape, have low manufacturing costs, and are small in weight, so the demand for pouch-type batteries is increasing.

An electrode film for forming an electrode assembly is manufactured in a form in which an active material is applied to a part and the active material is not applied to the remaining part, and an electrode body is exposed.

An exposed portion in which the electrode body is exposed as described above is processed to serve as an electrode terminal for connecting the positive electrode and the negative electrode when the electrode assembly is configured, and the electrode film processed is processed by applying the active material on a conductor of a thin film configuring the electrode body to enable such processing, and is indistinguishable.

In general, the notching device is a device that forms a terminal part by cutting the exposed portion of the electrode film and a part of the coating part to which the active material is applied, and forms the terminal part by cutting a part of the exposed portion by using punching or a laser.

In the related art, the noting device using punching is mainly used, but recently, the use of a notching device using a laser, which causes less damage to the electrode compared to punching, and achieves efficient production, is increasing.

When the laser is used in the related art, unlike the existing punching device, an efficient arrangement of the working machine need to be made in consideration of a path of the laser, but the current notching device has a problem in that laser efficiency is lowered.

PRIOR ART LITERATURE

Patent Document

Korean Patent No. 10-1802297
Korean Patent No. 10-1604052

SUMMARY OF THE INVENTION

The present invention has been made in an effort to solve the problems in the related art, and provides a flag forming device after laser notching of a secondary battery for an electric vehicle, which makes a flag shape by notching an uncoated portion having no coating of a negative electrode and a positive electrode with a laser, and makes the uncoated flag made by laser notching pass through a flag forming unit before winding to enable an uncoated tap to be folded inward.

An exemplary embodiment of the present invention provides a flag forming device after laser notching of a secondary battery for an electric vehicle, the flag forming device including: a tilt EPC unit configured to move a pole plate while maintaining a material uniformly and constantly at a setting value of an EPC sensor when the pole plate is moved; the EPC sensor configured to numerically indicate the degree of distortion when the pole plate is moved through the tilt EPC unit; a flag forming unit configured to mold a flag of the pole plate moved through the EPC sensor; an encoder roller configured to measure a movement distance of the pole plate passing through the flag forming unit; a winding unit configured to wind an electrode passing that has passed through the flag forming unit; and an air nozzle configured to blow air before an uncoated flag is wound in the winding unit to enable an uncoated tab to be folded inward.

The flag forming unit includes: one pair of forming rollers which rotate against each other for passing an electrode from top to bottom; an LM guide for preventing a roller from being curved during adjustment; a tension spring for preventing a foaming roller from being damaged and maintaining tension; a cross roller table installed in a lower portion of the forming roller to reinforce shaking of a front portion; a micro head for precise adjustment; and a motor for mutually rotating the forming roller and controlling synchronization of an encoder.

The present invention has an effect in that it is possible to form a flag in a manner that a flag shape is made by notching an uncoated portion having no coating of a negative electrode and a positive electrode with a laser, the uncoated flag made by laser notching passes through the flag forming unit before winding, and an uncoated tap is folded inward through the air nozzle.

BRIEF DESCRIPTION OF THE DRAWINGS

FIG. 1 is a diagram illustrating a flag forming unit in a winding device of the present invention.

FIG. 2 is a perspective view of a flag forming unit after laser notching of a circular secondary battery of the present invention.

FIG. 3A is a picture of an actual product in the case where flag forming is not performed, and FIG. 3B is a picture of an actual product in the case where flag forming is performed.

DETAILED DESCRIPTION

Hereinafter, an exemplary embodiment of the present invention will be described in detail with reference to the accompanying drawings.

FIG. 1 is a diagram illustrating a flag forming unit in a winding device of the present invention, and a flag forming device after laser notching of a secondary battery for an electric vehicle of the present invention includes a tilt EPC unit 1 which moves a pole plate while maintaining a material uniformly and constantly at a setting value of an EPC sensor when the pole plate is moved, the EPC sensor 2 which numerically indicates the degree of distortion when the pole plate is moved through the tilt EPC unit 1, a flag forming unit 3 which molds a flag of the pole plate moved through the EPC sensor 2, an encoder roller 4 which measures a movement distance of the pole plate passing through the flag forming unit 3, a winding unit 5 which winds an electrode that has passed through the flag forming unit 3, and an air nozzle 6 which blows air before an uncoated flag is wound in the winding unit 5 to enable an uncoated tab to be folded inward.

FIG. 2 is a perspective view of the flag forming unit 3 of the present invention, and includes one pair of forming rollers 7 for passing the electrode from top to bottom, an LM guide 8 for preventing a roller from being curved during adjustment, a tension spring 9 for preventing the foaming roller 7 from being damaged and maintaining tension, a cross roller table 10 for reinforcing the shaking of a front portion in a lower portion of the forming roller 7, a micro head 11 for precise adjustment, and a motor 12 for mutually rotating the forming roller 5 and controlling synchronization of an encoder.

The operation of the present invention formed as described above will be described.

A circular secondary battery for an electric vehicle is made by making a flag shape by processing an uncoated portion having coating of a negative electrode and a positive electrode with a laser, folding the flag shape, and welding a terminal on the flag shape, and the folding of the flag before winding the secondary battery in this way is called flag forming.

Further, the process of making the flag by processing with a laser is called notching, and the uncoated flag made by laser notching passes through the flag forming unit 3 illustrated in FIG. 1 before winding and an uncoated tap is folded inward by air of the air nozzle 6 and moves toward the winding side.

In this case, when the tap of the uncoated portion in the wound jelly roll is viewed, the flag is wound while being folded in the form illustrated in FIG. 3 and is positioned.

Herein, a forming method without self-driving force is a method in which a roller is attached to make the shape with pressure during winding, and is suitable to continuous winding and is advantageous in terms of costs, but it is preferable that the present invention uses a forming method having self-driving force.

That is, the method of forming with self-driving force is a method of rotating and moving the forming roller 7 by driving of the motor 12 without attachment of the electrode during winding, and is advantageous for high-speed winding and synchronizes an electrode movement and a winding speed while driving the electrode movement to improve quality, to move the forming roller in the winding direction.

In the notching processing portion, the electrode film that is a processed product is notching processed at every predetermined pitch for forming an electrode tap by shearing the uncoated portion of the electrode film of the secondary battery, and laser cutting devices located at a right end and a left end of the electrode film cut the electrode film, and in this case, each of the laser cutting device moves in a shape of "▷ ◁" to cut both side ends of the electrode film.

When both side ends of the electrode film rapidly transferred from top to bottom is cut in the shape of "▷ ◁", the electrode tap is formed at every predetermined pitch of the electrode film.

The uncoated tap of the electrode film is folded inward by blowing air through the air nozzle 6 before the cut electrode film is wound by the winding unit 5, and a flag shape is made by notching the uncoated portion having no coating of a negative electrode and a positive electrode with laser, and the uncoated flag made by laser notching passes through the flag forming unit before being wound, so that the uncoated tap is folded inward.

FIG. 3A is a picture of an actual product in the case where existing flag forming is not performed, and FIG. 3B is a picture of an actual product in the case where flag forming is performed according to the present invention.

The present invention as described above is illustrative of the technical spirit, and those skilled in the art to which the present invention pertains may make various modifications, changes and substitutions within the scope without departing from the essential characteristics of the present invention.

Therefore, the embodiments disclosed in the present invention and the accompanying drawings are not intended to limit the technical spirit of the present invention, but are intended to illustrate the scope of the technical idea of the present invention, and the scope of the present invention is not limited by the embodiment and the accompanying drawings.

The scope of the present invention shall be construed on the basis of the accompanying claims in such a manner that all of the technical ideas included within the scope equivalent to the claims belong to the scope of the present invention.

What is claimed is:

1. A flag forming device after laser notching of a secondary battery for an electric vehicle, the flag forming device comprising:
    a tilt EPC unit configured to move a pole plate while maintaining a material uniformly and constantly at a setting value of an EPC sensor when the pole plate is moved;
    the EPC sensor configured to numerically indicate the degree of distortion when the pole plate is moved through the tilt EPC unit;
    a flag forming unit configured to mold a flag of the pole plate moved through the EPC sensor;
    an encoder roller configured to measure a movement distance of the pole plate passing through the flag forming unit;
    a winding unit configured to wind an electrode passing that has passed through the flag forming unit; and
    an air nozzle configured to blow air before an uncoated flag is wound in the winding unit to enable an uncoated tab to be folded inward.

2. The flag forming device of claim 1, wherein the flag forming unit includes:
    one pair of forming rollers for passing an electrode from top to bottom;
    an LM guide for preventing a roller from being curved during adjustment;
    a tension spring for preventing a foaming roller from being damaged and maintaining tension;
    a cross roller table for reinforcing shaking of a front portion in a lower portion of the forming roller;
    a micro head for precise adjustment; and
    a motor for mutually rotating the forming roller and controlling synchronization of an encoder.

* * * * *